(No Model.) 2 Sheets—Sheet 1.

J. H. BUSELL.
LEATHER SKIVING MACHINE.

No. 316,006. Patented Apr. 21, 1885.

Witnesses:
Walter E. Lombard.
William H. Parry

Inventor:
James H. Busell,
by N. C. Lombard
Attorney.

N. PETERS, Photo-Lithographer, Washington, D. C.

(No Model.) 2 Sheets—Sheet 2.

J. H. BUSELL.
LEATHER SKIVING MACHINE.

No. 316,006. Patented Apr. 21, 1885.

Witnesses:
Walter E. Lombard.
William H. Parry.

Inventor:
James H. Busell,
by N. C. Lombard
Attorney.

UNITED STATES PATENT OFFICE.

JAMES H. BUSELL, OF BOSTON, MASSACHUSETTS, ASSIGNOR OF ONE-HALF TO ALBERT LEAVITT, OF SAME PLACE.

LEATHER-SKIVING MACHINE.

SPECIFICATION forming part of Letters Patent No. 316,006, dated April 21, 1885.

Application filed November 24, 1884. (No model.)

*To all whom it may concern:*

Be it known that I, JAMES H. BUSELL, of Boston, in the county of Suffolk and State of Massachusetts, have invented certain new and useful Improvements in Leather-Skiving Machines, of which the following, taken in connection with the accompanying drawings, is a specification.

My invention relates to machines for skiving leather, and is designed more especially for skiving the edges of thin, soft, pliable pieces of leather—such, for instance, as the vamps and quarters of ladies' fine boots and shoes, notably such as are made of glove-kid; and it consists in certain novel constructions, arrangements, and combinations of parts, which will be best understood by reference to the description of the drawings and to the claims to be hereinafter given.

Figure 1:
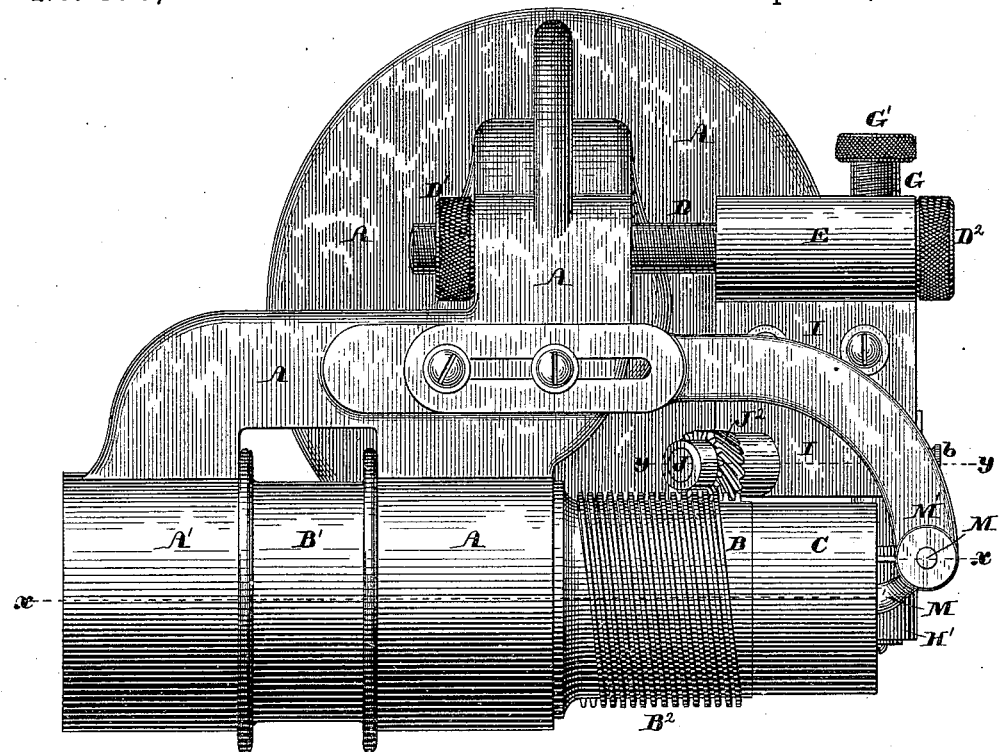
Figure 2:
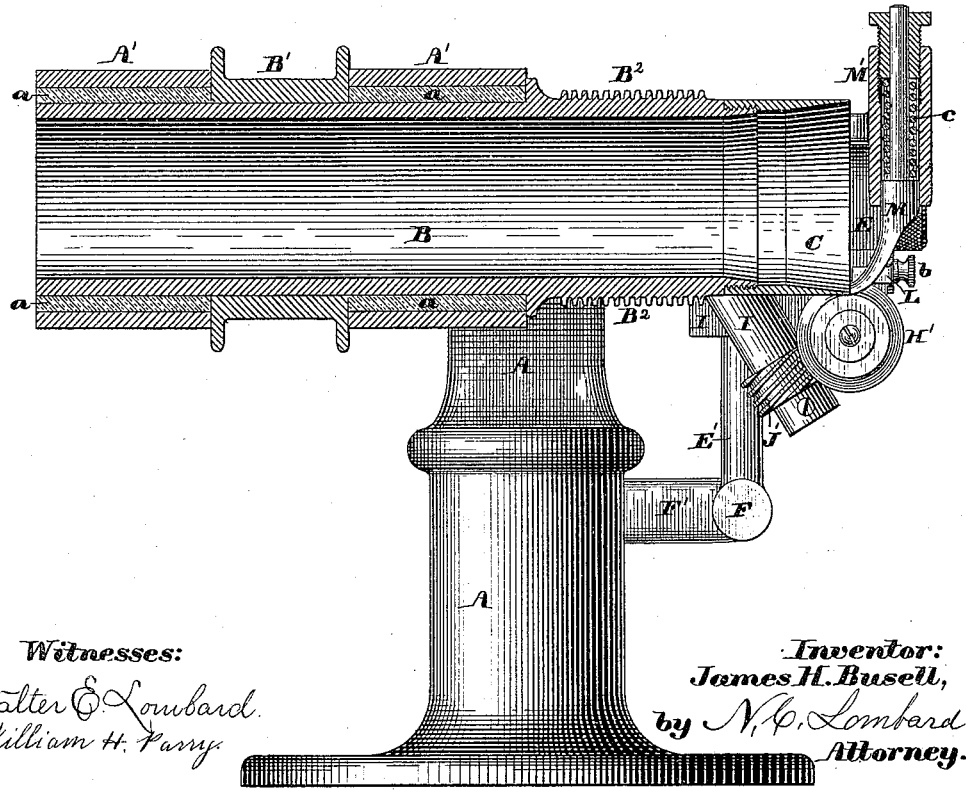
Figures 3, 5:
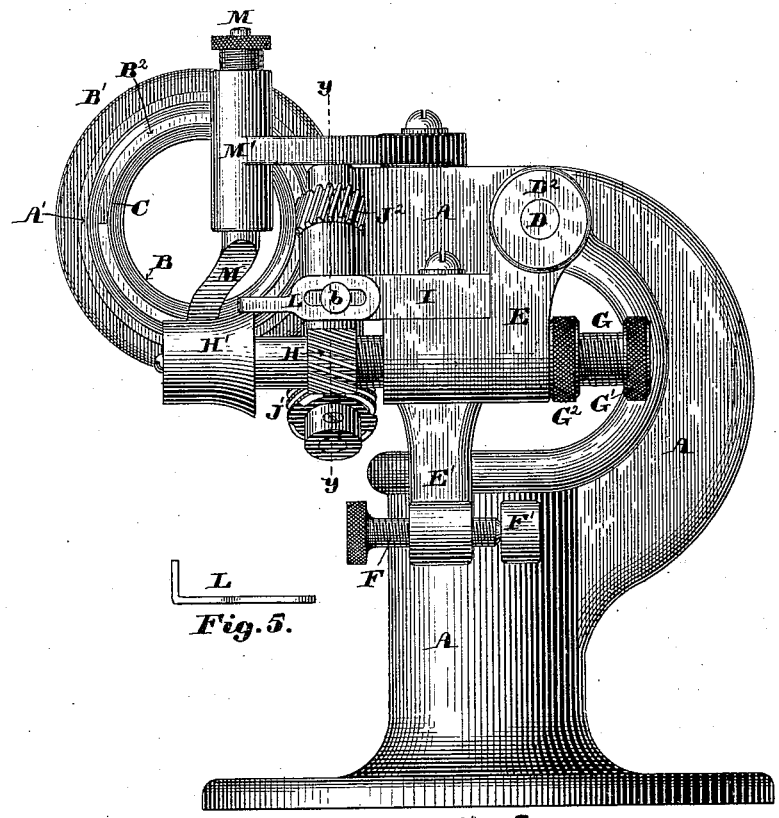
Figure 4:
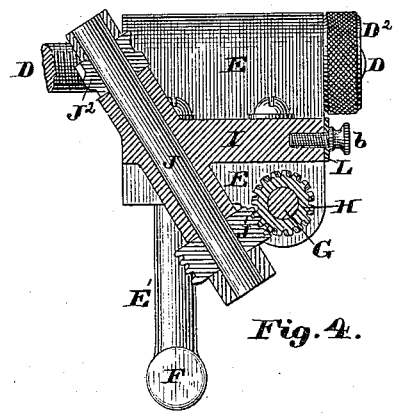

Figure 1 of the drawings is a plan of a machine embodying my invention. Fig. 2 is a vertical section on line $x$ $x$ on Fig. 1, and showing parts beyond in elevation. Fig. 3 is an end elevation. Fig. 4 is a partial vertical section on line $y$ $y$ on Figs. 1 and 3, and Fig. 5 is a plan of the gage for guiding the work to the knife.

A is the main standard or frame of the machine, which may be made of sufficient height to stand upon the floor, if desired; or it may be constructed as shown in the drawings, and made fast to a bench of suitable height. The upper portion of the standard A, which is curved backward and then forward, is bifurcated and bored out to form the two bearings A' A', in which is mounted the hollow shaft B, provided with the driving-pulley B', by means of which and a suitable belt (not shown) leading therefrom to any suitable counter-shaft, a rotary motion at a high rate of speed may be imparted to said shaft. The bearings A' A' are each provided with a composition bushing, $a$ $a$. The hollow shaft B has formed upon one end thereof a male screw-thread, upon which is screwed the ring-knife C, as shown in Fig. 2.

D is a threaded spindle fitted to a threaded hole in the stand or frame A, in which it may be adjusted endwise and secured in any desired position by the milled nut D'. The spindle D has a portion of its length turned smooth, and to a smaller diameter than its threaded portion, upon which is mounted and secured, by the milled nut $D^2$, the pendent stand E, which may be adjusted about the spindle D by means of the set-screw F, fitted to a threaded bearing in the arm E' of the stand E, and bearing against the ear or lug F', projecting from the stand A, as shown in Fig. 3.

G is another threaded spindle fitted to a threaded bearing in the pendent stand E, in which it may be adjusted endwise by means of the milled head G', and secured in any desired position therein by the milled check-nut $G^2$. A portion of the spindle G at its end opposite to the milled head G' is turned smooth, and to a smaller diameter than its threaded portion, and has loosely fitted thereon, so as to revolve freely thereon, the worm-wheel H and feed-roll H', which may be made in one piece, as shown; or they may be made separately and firmly secured together, so that they will rotate together as one piece. The feed-roll H' is made cylindrical for about one-half its length, while the periphery of the other half is curved longitudinally to correspond to the curve of the circumference of the ring-knife C, and may be readily adjusted by means of the spindle G and set-screw F to a position eccentric to the periphery of said knife.

I is a stand screwed to the stand E, and having mounted therein the oblique shaft J, upon the lower end of which is secured the worm J', which engages with and imparts motion to the worm-wheel H, and upon its upper end has secured the worm-wheel $J^2$, with which the worm-thread $B^2$ on the hollow shaft B engages to rotate the shaft J.

L is a gage, adjustably secured to the stand I by the clamping-screw $b$, as shown in Fig. 3, and arranged to guide the material to be skived to the cutter.

M is a presser-foot fitted to a bearing in the stand M', and having its shank surrounded by the spiral spring $c$, by which it is pressed upon the material to be skived immediately in front of the edge of the knife C, as shown in Fig. 2.

A very important feature of my improved machine is, that by virtue of the adjustable spindle D, carrying with it the stand E and feed-roll H', said feed-roll may always be maintained in a position with its axis directly beneath the cutting-edge of the knife C, as said knife is worn up or becomes shorter by grinding.

What I claim as new, and desire to secure by Letters Patent of the United States, is—

1. The ring-knife C, in combination with a work supporting and feeding roll arranged with its axis in the plane of revolution of the cutting-edge of the knife, substantially as described.

2. The ring-knife C, in combination with the longitudinally-curved work feeding and supporting roll H', arranged with its axis in the plane of revolution of the cutting-edge of said knife, substantially as described.

3. The combination of the ring-knife C with a work feeding and supporting roll arranged with its axis in the plane of revolution of the cutting-edge of said knife, a pivoted stand for supporting said roll, and a screw-pivot for said stand, whereby said roll is rendered adjustable about an axis eccentric to said knife, and also in a direction parallel to the axis of said knife, substantially as described.

4. In combination with the ring-knife C, the adjustable spindle D, the pendent stand E, the adjustable spindle G, and the feed-roll H', all arranged and adapted to operate substantially as described.

5. The combination of the shaft B, provided with the worm-thread $B^2$, the ring-knife C, the oblique shaft J, the worm-wheels $J^2$ and H, the worm J', and the feed-roll H', all arranged and adapted to operate substantially as described.

6. In combination with the ring-knife C and the feed-roll H', the presser-foot M, arranged to press upon the material in close proximity to the cutting-edge of the knife, substantially as described.

In testimony whereof I have signed my name to this specification, in the presence of two subscribing witnesses, on this 18th day of November, A. D. 1884.

JAMES H. BUSELL.

Witnesses:
N. C. LOMBARD,
WALTER E. LOMBARD.